United States Patent
Aronson et al.

(10) Patent No.: US 7,359,643 B2
(45) Date of Patent: Apr. 15, 2008

(54) OPTICAL TRANSCEIVER MODULE WITH POWER INTEGRATED CIRCUIT

(75) Inventors: Lewis B. Aronson, Los Altos, CA (US); Greta L. Light, San Mateo, CA (US); Stephen G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 644 days.

(21) Appl. No.: 10/614,112

(22) Filed: Jul. 3, 2003

(65) Prior Publication Data

US 2004/0008996 A1 Jan. 15, 2004

Related U.S. Application Data

(63) Continuation-in-part of application No. 09/777,917, filed on Feb. 5, 2001, now Pat. No. 7,079,775, and a continuation-in-part of application No. 10/266,870, filed on Oct. 8, 2002, now Pat. No. 6,912,361.

(51) Int. Cl.
 *H04B 10/00* (2006.01)
(52) U.S. Cl. ......................................... 398/136; 398/38

(58) Field of Classification Search .................. 398/38, 398/94, 136, 197, 135, 139
See application file for complete search history.

(56) References Cited

U.S. PATENT DOCUMENTS

| | | | | |
|---|---|---|---|---|
| 4,675,770 A | * | 6/1987 | Johansson | 361/18 |
| 5,040,242 A | * | 8/1991 | Tsuchiya et al. | 398/116 |
| 5,929,982 A | * | 7/1999 | Anderson | 356/73.1 |
| 5,953,690 A | * | 9/1999 | Lemon et al. | 702/191 |
| 6,488,416 B1 | * | 12/2002 | Shishikura et al. | 385/88 |
| 6,603,326 B1 | * | 8/2003 | Tse et al. | 324/765 |

* cited by examiner

*Primary Examiner*—Christina Leung
(74) *Attorney, Agent, or Firm*—Workman Nydegger

(57) ABSTRACT

The optical transceiver module includes a housing and a plurality of components disposed at least partially within the housing. The components include an optical transmitter, an optical receiver, and a power controller integrated circuit (IC). The power controller IC is electrically coupled to at least one of the plurality of components. The power controller IC is configured to perform power supply functions for the optical transceiver module. Also, the power controller IC includes multiple voltage regulators providing power to the components at two or more voltages.

20 Claims, 8 Drawing Sheets

OPTICAL TRANSCEIVER MODULE WITH POWER INTEGRATED CIRCUIT

This patent application is a Continuation-In-Part application of patent application Ser. No. 09/777,917, filed Feb. 5, 2001 now U.S. Pat. No. 7,079,775, and of patent application Ser. No. 10/266,870, filed Oct. 8, 2002, now U.S. Pat. No. 6,912,361 both of which are hereby incorporated by reference.

BACKGROUND OF THE INVENTION

1. Field of the Invention

The present invention relates generally to the field of fiber optic transceivers and particularly to an optical transceiver having an internal power controller integrated circuit (IC) for regulating and supplying power to the various components within the optical transceiver module.

2. Description of Related Art

Fiber optic transceivers, otherwise know as optoelectronic transceivers, transmit and receive both light and electronics signals, i.e., they provide for the bi-directional communication of signals between an electrical interface and an optical interface.

FIG. 1 is a schematic representation of the circuitry and components found in various prior-art fiber optic transceivers 100. The fiber optic transceiver 100 includes a circuit board 102 that contains at a minimum a receiver circuit, a transmit circuit, a power connection 104, and a ground connection 106.

The receiver circuit receives relatively small optical signals at an optical detector and amplifies and limits the signals to create a uniform amplitude digital electronic output. The receiver circuit typically consists of a Receiver Optical Subassembly (ROSA) 108, which typically includes a fiber receptacle as well as a photodiode and pre-amplifier (preamp) circuit. The ROSA 108 is in turn connected to a post-amplifier (postamp) integrated circuit (IC) 110, which generates a fixed output swing digital signal which is connected to outside circuitry via RX+ and RX− pins 112. The postamp IC 110 also often provides a digital output signal known as Signal Detect (SD), or Loss of Signal (LOS), indicating the presence or absence of a suitably strong optical input. This Signal Detect (SD) output is provided via a SD output pin 114.

The transmitter circuit, or laser driver circuit, accepts high speed digital data and electrically drives a Light Emitting Diode (LED) or laser diode to create equivalent optical pulses. The transmit circuit typically consists of a Transmitter Optical Subassembly (TOSA) 116 and a laser driver IC 118. The TOSA 116 typically includes a fiber receptacle as well as a laser diode or LED. The laser driver IC 118 typically includes an alternating current (AC) driver to provide AC current to the laser diode or LED. The laser driver IC 118 also typically includes a direct current (DC) driver to provide bias current to the laser diode or LED. The signal inputs for the AC driver are obtained from TX+ and TX− pins 120.

In addition, some optical transceiver standards require additional transceiver functionality. For example, the Giga-Bit Interface Converter (GBIC) standard requires eye safety and general fault detection functionality. This functionality is used to identify abnormal and potentially unsafe operating parameters and to report these to the user and/or perform laser shutdown, if appropriate. This functionality may be integrated into the laser driver IC 118 itself or into an optional eye safely IC 122. To enable this functionality, TX disable 124 and TX fault 126 pins are provided. The TX disable pin 124 allows the TOSA 116 to be shut off by a host device, while the TX fault pin 124 communicates a fault condition in the laser, or associated laser driver IC 118, to the host device. In addition to this basic description, the GBIC standard includes a series of timing diagrams describing how these controls function and interact with each other to implement reset operations and other actions. The GBIC standard also requires an Electrically Erasable Programmable Read Only Memory (EEPROM) 128 to store standardized serial identification (ID) information that can be read via a serial interface (defined as using the serial interface of the ATMEL AT24C01A family of EEPROM products) consisting of clock 130 and data 132 lines.

In use, various components, such as the laser driver IC 118, typically require individual setup and adjustment. Setup of these components generally occurs each time the optical transceiver is powered-up, as the individual components generally have volatile memories that lose setup data when powered-down. Adjustment, on the other hand, is typically required to account for variations in component characteristics, such as laser diode threshold current and slope efficiency either on a part to part basis or based on temperature. Parameters that are adjusted are: bias current and AC modulation. This setup and adjustment is generally performed on each optical transceiver by adjusting variable resistors or by connecting resistors 134, having factory selected resistance values, to the laser driver IC 118. Additionally, temperature compensation of the bias current and modulation is often required, which is important to key laser characteristics, such as slope efficiency. Temperature compensation can be integrated into the laser driver IC 118 or accomplished through the use of external temperature sensitive elements, such as thermistors 136.

The above described optical transceiver has a number of drawbacks. For example, it is time consuming and costly to detect the variations of the various components, select the correct resistors 134 and thermistors 136 (or adjust the variable resistors), and/or install these on the circuit board 102 of the optical transceiver 100. In addition, such resistors and/or thermistors take up valuable space on the circuit board 102. Moreover, each time additional features are added to the optical transceiver, the complexity of the circuitry increases significantly. For example, in use, as many as twelve connections may be needed to the transmitter circuit, thereby significantly increasing circuitry complexity. Still further, such prior art systems are generally not scalable, i.e., they cannot easily be expanded to allow additional functionality.

More recently, analog signal lines have been introduced to setup and adjust these components. The analog signals lines may include analog inputs 138, such as bias current, modulation amplitude, and disable inputs, or analog outputs 140, such as actual bias, temperature, and output power. However, these analog signals lines do not address many of the drawbacks of the abovementioned prior art. For example, a high number of inputs and outputs are still required, which leads to complex circuitry that takes up a significant amount of space on the circuit board 102. These optical transceivers are still not scalable.

Dedicated digital connections, such as serial input 142 and output 144 connections, to these components have been introduced. An example of a digital output is a fault indicator, e.g., indicating that the transceiver module is running too hot. Optical transceivers employing these dedicated digital connections typically include a controller IC 148 located either within, or outside, the optical transceiver 100.

Inputs and/or outputs 150 between the host and the controller IC 148 are typically also provided. However, optical transceivers employing dedicated digital connections do not fully address the abovementioned drawbacks. For example, the circuitry is still highly complex, especially for multiple inputs/outputs. This circuitry, as in other prior art optical transceivers, takes up valuable circuit board space.

In light of the above, an optical transceiver that addresses the abovementioned drawbacks would be highly desirable. In particular, such an optical transceiver should be simple to manufacture and operate; reduce complexity by providing a simple circuitry layout; use a minimal amount of circuit board space; and allow for scalability.

In addition, modern optical transceiver modules include a multitude of components, sometimes requiring two or more separate power sources and/or a different power supply voltages. For example, while many transceiver components require a voltage of 1.7v to 6v, an Avalanche Photo Diode (APD) typically requires anywhere from 40v to 75v. These, voltages supplied to the various components are typically supplied by discrete power sources, or power sources external to the optical transceiver module. Such power sources take up valuable space and add further expense to the overall optical transceiver system. Also, these power sources are typically fixed and not adjustable by the optical transceiver module itself. Furthermore, there are instances in which the use of a certain component in an optical transceiver would be preferred, but due to the requirement of a different power supply not available in the transceiver module, another component is used in its place.

In light of the above, an optical transceiver that includes a power controller having multiple power sources within the optical transceiver module would be highly desirable. Such power sources should be simple to manufacture and operate, should reduce complexity by providing a centralized source of power, and should require a minimal amount of circuit board space. Furthermore, it would be desirable for one or more of the power sources of the power controller to be adjustable, so as provide power to a variety of different components that might be included in a transceiver module. More generally, having one or more adjustable power sources in a power controller would allow for future modifications and scalability of the optical transceiver modules in which the power controller is used.

SUMMARY OF THE INVENTION

According to the invention there is provided an optical transceiver module. The optical transceiver module includes an optical transmitter, such as a laser in a TOSA, and an optical receiver, such as a PIN detector in a ROSA. The optical transceiver module also includes an internal serial bus and a plurality of addressable components electrically coupled to the internal serial bus. Each of the addressable components includes a serial interface for communicating with the internal serial bus, and a memory. Each addressable component also includes a unique address, or chip select logic coupled to a controller via a chip select line. This allows data to be addressed to specific addressable components. The addressable components may also include an analog to digital converter and/or a digital to analog converter. The plurality of addressable components may include components selected from a laser driver, a laser bias controller, a power supply circuit or controller, a pre-amplifier, a post-amplifier, a laser wavelength controller, a main controller, a thermoelectric cooler (TEC), an analog-to-digital converter, a digital-to analog converter and/or an APD bias controller, or any combination of these components.

Consequently, the above described transceiver module includes a single, shared internal serial bus that connects to numerous components in the transceiver module. This allows a plurality of functions to be performed via a single electrical connection to each component. Also, overall system complexity is reduced by eliminating the need for multiple analog or digital lines to each component. This conserves valuable board area for other components or circuitry and may even allow for a more compact transceiver module. In addition, the internal serial bus allows for scalability. For example, new integrated circuits (ICs) may be coupled to the internal serial bus, thereby sharing input and output ports on the main controller. These input and output ports are generally used for sending setup commands to the ICs or receiving monitoring information from the ICs. In addition, new ICs having additional functionality or features may be swapped with existing ICs without requiring any additional input and output ports, i.e., adding functionality with little circuit redesign.

Moreover, the above described transceiver module provides more complete and accurate control and monitoring of the transceiver module's parameters.

According to the invention there is provided an optical transceiver module. The optical transceiver module includes a housing and a plurality of components disposed at least partially within the housing. The components include an optical transmitter, an optical receiver, and a power controller integrated circuit (IC). The power controller IC is electrically coupled to at least one of the plurality of components. The power controller IC is configured to perform power supply functions for the optical transceiver module. Also, the power controller IC includes multiple voltage regulators providing power to the components at two or more voltages.

In a preferred embodiment, at least one of the multiple voltage regulators is a low drop-out voltage regulator configured to receive an unregulated input voltage and configured to supply a regulated output voltage to at least one of the components. Also in a preferred embodiment, at least one of the multiple voltage regulators is a boost or buck regulator electrically coupled to at least one of the components. The power controller IC may further include a serial bus within the power controller IC. The multiple voltage regulators may then be electrically coupled to the serial bus. The power controller IC may further include a serial interface electrically coupled to the serial bus.

In a preferred embodiment, the components further include a main controller electrically coupled to the serial interface, a laser driver IC electrically coupled to the optical transmitter, and a post-amplifier IC electrically coupled to the optical receiver. In use, the main controller can control at least one of the multiple voltage regulators. Each of the voltage regulators are preferably individually addressable. At least one of the voltage regulators also preferably includes an Avalanche Photo Diode (APD) voltage supply. Also, at least one of the voltage regulators is preferably adjustable. In a preferred embodiment, the power controller IC further includes an analog to digital converter, a temperature sensor, a digital to analog converter, a logic module, an inrush current limiter, and a processor management module.

In this way, a single power controller IC is used to supply power to the various components within the optical transceiver. This power controller IC is simple to operate and clearly reduces circuitry complexity by providing a centralized source of power. Furthermore, a single power controller IC requires significantly less circuit board space than prior power sources. In addition, such power sources are adjustable, i.e., the main controller can set the voltages and/or shutdown the regulators, if necessary. This adjustability may be used to compensate for component degradation over time. In other words, as a component degrades over time its voltage requirements may increase. Moreover, such adjustability provides for the power requirements of future optical transceivers without requiring a complete redesign of the power supply. Such adjustability also makes such an optical transceiver more scalable. Finally, the power controller IC provides for more precise temperature control and compensation.

BRIEF DESCRIPTION OF THE DRAWINGS

For a better understanding of the nature and objects of the invention, reference should be made to the following detailed description, taken in conjunction with the accompanying drawings, in which.

Figure 1:
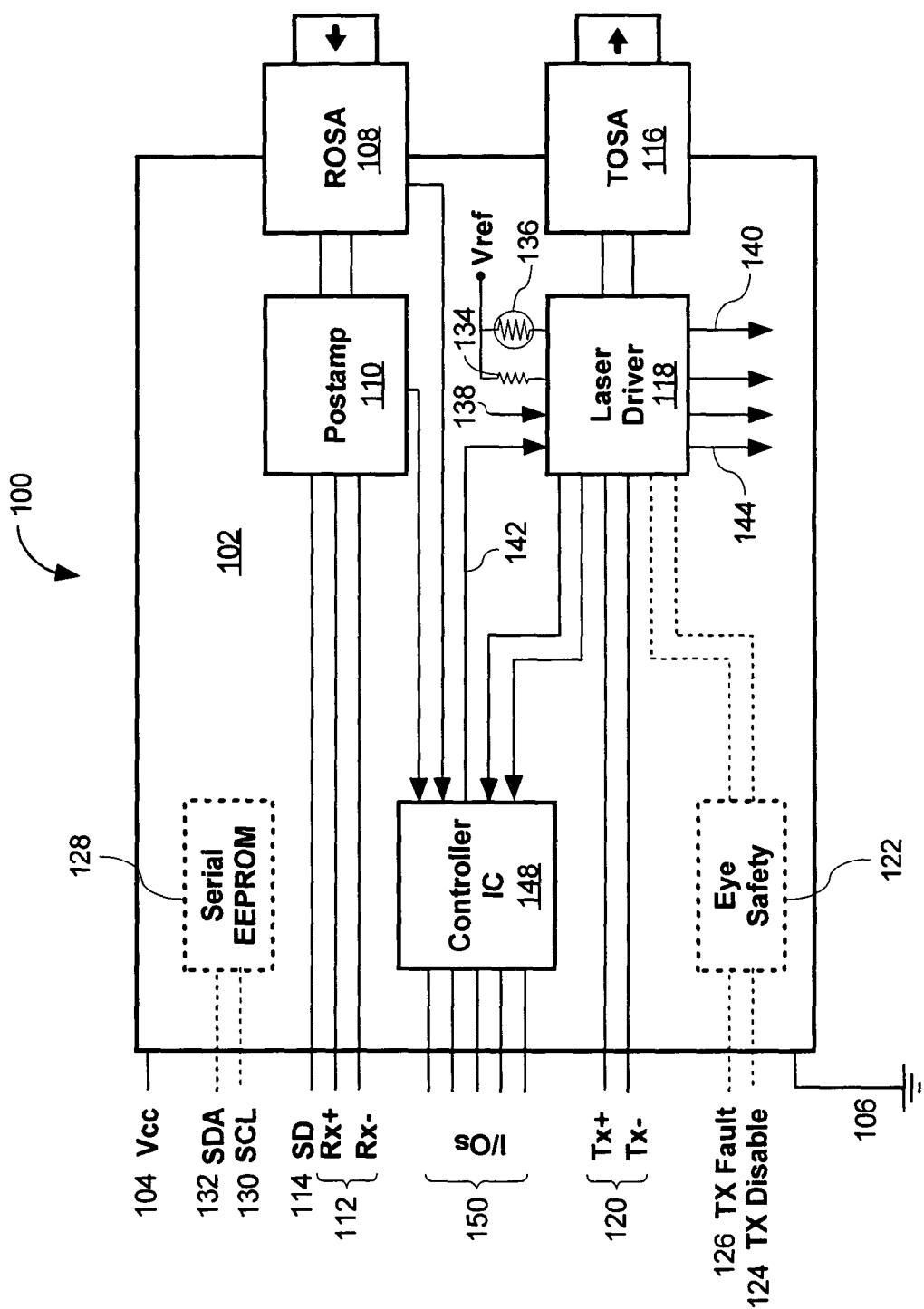
FIG. 1 is a schematic representation of the circuitry and components of various prior-art fiber optic transceivers.

Like reference numerals refer to corresponding parts throughout the several views of the drawings. For ease of reference, the first number of any reference numeral generally indicates the figure number in which the reference numeral can be found. For example, 132 can be found in FIG. 1, and 304 can be found in FIG. 3.

DETAILED DESCRIPTION OF PREFERRED EMBODIMENTS

The present invention utilizes a shared internal serial bus to communicate with multiple addressable components in an optical transceiver module. As will be shown, the shared serial bus simplifies overall transceiver setup, control, monitoring, and safety functions, while reducing system complexity, freeing-up valuable board space, and allowing for scalability. In a preferred embodiment, the serial bus monitors: laser bias current from the laser bias controller; laser output power; received average power; received modulated power; APD bias voltage; temperature; current in a thermoelectric cooler (TEC) controller; temperature in the TEC controller; wavelength; error rates; signal integrity; or the like.

Figure 2A:
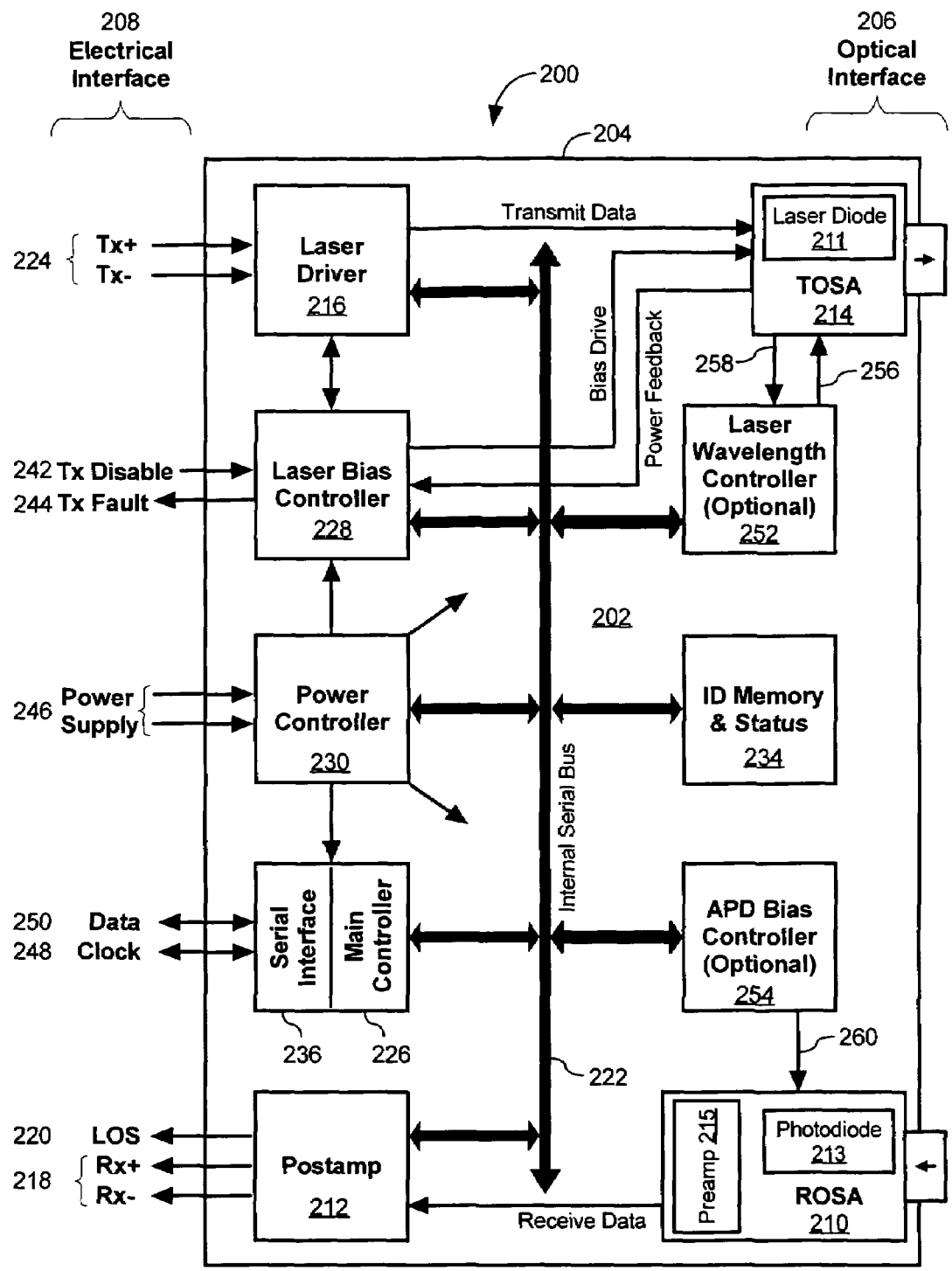
FIG. 2A is a schematic representation of the circuitry and components of an optical transceiver module that uses a component address serial protocol, according to an embodiment of the invention.

FIG. 2A is a schematic representation of the circuitry and components of an optical transceiver module that uses a component address serial protocol, according to an embodiment of the invention. The transceiver module 200 preferably includes at least one circuit board 202 having multiple addressable components disposed thereon. The transceiver module 200 is preferably at least partially contained within a transceiver housing 204. The transceiver module 200 includes an optical interface 206 for receiving and transmitting optical signals, and an electrical interface 208 for receiving and transmitting electrical signals. The transceiver module 200 contains a ROSA 210 electrically coupled to a post-amplifier IC 212, and a TOSA 214 electrically coupled to a laser driver IC 216.

The ROSA 210 receives relatively small optical signals at an optical receiver or detector, such as a photodiode 213. These signals are converted to electrical signals and amplified by the post-amplifier IC 212 to create a uniform amplitude digital electronic output, which is transmitted to external circuitry via RX+ and RX− pins 218. The post-amplifier IC 212 also preferably provides a digital output signal known as Signal Detect (SD), or Loss of Signal (LOS), at LOS pin 220, indicating the presence or absence of a suitably strong optical input.

In a preferred embodiment, the small optical signals received at the ROSA are first amplified by a pre-amplifier IC 215, generally located within the ROSA package, before being sent to the post-amplifier IC 212. In an alternative embodiment, the pre-amplifier IC 215 is coupled directly to a shared serial bus 222.

The post-amplifier IC 212 is also preferably an addressable component electrically coupled to a shared serial bus 222 via a serial connection. The shared serial bus 222 is preferably located on the circuit board 202, at least partially internal to the transceiver housing 204. A number of digital signals and/or data may be communicated between the post-amplifier IC 212 and the main controller 226, or other devices within the transceiver, via the shared serial bus 222. Such digital signals and/or data may include: output amplitude setting data, slew rate data, LOS thresholds and status data, equalization data, received signal power, loss of signal data, or a subset of these.

The laser driver IC 216 accepts high speed digital data from external circuitry to electrically drive the TOSA 214 to create equivalent optical pulses. The TOSA 214 preferably contains an optical transmitter, such as a LED or laser diode 211. The laser driver IC 216 preferably includes an AC driver to provide AC current to the laser diode or LED. The signal inputs for the laser driver IC 216 are obtained from TX+ and TX− pins 224.

The laser driver IC 216 is also preferably an addressable component electrically coupled to the shared serial bus 222 via a serial connection. A number of digital signals and/or data may be communicated between the laser driver IC 216 and the main controller 226, or other devices within the transceiver module 200, via the shared serial bus 222. Such digital signals and/or data may include: modulation amplitude data, slew rate data, equalization data, other control parameters or monitoring data, or any subset of these.

The transceiver module 200 also preferably includes a number of other addressable components, such as a main controller IC 226, a laser bias controller IC 228, a power controller IC 230, and an ID memory and status IC 234, or a subset of these. Each of the aforementioned addressable components is electrically coupled to the shared internal serial bus 222 via a separate serial connection.

The main controller IC 226 implements most setup, control, and monitoring functions of the transceiver module 200, such as temperature compensation, diagnostic feedback, variation adjustments and calibration, or the like. The main controller IC 226 also acts as the serial bus master for the shared serial bus 222. Although not shown, the main controller IC 226 preferably includes a non-volatile memory. Further description of a similar main controller IC can be found in co-pending U.S. patent application Ser. No. 09/777,917, which is incorporated herein by reference.

The laser bias controller IC 228 is used to control key parameters of the laser driver IC 216 and the TOSA 214, such as safety and general fault detection functionality. This functionality is used to identify abnormal and potentially unsafe operating parameters and to report these to the user and/or perform laser shutdown, if appropriate. To enable this functionality, TX disable 242 and TX fault 244 pins are provided. The TX disable pin 242 allows the TOSA 214 to be shut off by a host device. The TX fault pin 244 communicates a fault condition in the laser or LED, or associated laser driver IC 216, to a host device (not shown).

In one embodiment, the laser bias controller IC 228 is also preferably electrically coupled directly to the TOSA 214. This direct electrical connection to the TOSA 214 is used to directly control the laser bias current and the AC modulation level to the TOSA 214, thereby operating the laser driver in a constant bias mode operation. A direct electrical connection to the TOSA 214 is also preferably used to receive a laser power feedback from the TOSA 214.

In another embodiment, the outputs of the laser bias controller IC 228 control the level of average output power of the laser driver IC 216 in addition to the AC modulation level, thereby operating the laser driver in a constant power mode operation.

The laser bias controller IC 228 is also electrically coupled to the shared serial bus 222 via a serial connection. A number of digital signals and/or data may be communicated between the laser bias controller IC 228 and the serial bus 222. Such digital signals and/or data include: bias settings and status, power settings and status, error thresholds and status, temperature compensation settings, other control settings, other status signals, or a subset thereof.

The power controller IC 230 provides and regulates power to the transceiver module 200. A power supply is connected to the module 200 at power supply input pins 246. The power controller IC 230 is also electrically coupled to all components that require a power supply. The power controller IC 230 is also electrically coupled to the serial bus 222 via a serial connection. A number of digital signals and/or data may be communicated between the power controller IC 230 and the main controller 226, or other devices within the transceiver module 200, via the serial bus 222. Such digital signals and/or data include: voltage commands, voltage and current status, temperature, power down or sleep mode, control signals, step-up signals, step-down signals, surge control functions, or the like. The power controller IC 230 preferably includes two or more voltage regulators, with each voltage regulator providing either a fixed or programmable voltage that can be supplied to one or more of the components of the transceiver module 200. The power controller IC 230 is coupled to each of the other components of the transceiver module 200 that require regulated power. Since each of the components or IC's in the transceiver 200 potentially requires a different regulated supply voltage, the power controller IC 230 may be implemented using multiple integrated circuits, including two or more voltage regulator IC's and a logic circuit IC.

A host serial interface controller 236, coupled directly to the main controller 226, communicates with a host device (not shown). The host serial interface controller 236 couples to a host serial bus (not shown) via clock 248 and data 250 lines. The host serial interface controller 236 is used for all setup and querying of the main controller IC 226. In a preferred embodiment, the host serial interface controller 236 operates in accordance with a two wire serial interface standard that is used in the GBIC and SFP (Small Form Factor Pluggable) standards. A host serial bus (not shown), coupled to the host serial interface controller 236, is preferably an I2C (Inter-IC) or MDIO bus. An I2C or $I^2C$ bus is a bi-directional two-wire serial bus that provides a communication link between integrated circuits. An MDIO bus is a Management Data Input/Output bus, as described by the IEEE 802.3 specification. Alternatively, another bi-directional serial interface could be used.

In the embodiment shown in FIG. 2A, the internal serial bus 222 utilizes a component address serial protocol that addresses each addressable component using the component's unique component address 418 (FIG. 4A), as described below. Examples of a suitable component address serial protocol include I2C (or $I^2C$) and MDIO.

In some embodiments the transceiver module 200 also includes a laser wavelength controller IC 252 coupled to the TOSA 214 and to the shared serial bus 222. The laser wavelength controller IC 252 preferably controls the temperature of the laser diode in the TOSA 214 so as to control wavelength of the light generated by the laser diode. A suitable wavelength controller IC 252 is a thermoelectric cooler (TEC). The laser wavelength controller IC 252 may also control the wavelength by any other suitable means, such as voltage, current bias, or the like. Precise control of the laser wavelength is important in wavelength division multiplexing applications, in which light from multiple laser diodes at multiple respective wavelengths is transmitted over a single optical fiber. The light at each wavelength is used to transmit a distinct signal or data stream. The laser wavelength controller IC 252 provides a laser temperature drive 256 to the TOSA 214, and receives laser temperature or wavelength feedback 258 from the TOSA 214.

The laser wavelength controller IC 252 is also preferably an addressable component electrically coupled to the shared serial bus 222 via a serial connection. A number of digital signals and/or data may be communicated between the laser wavelength controller IC 252 and the main controller 226, or other devices within the transceiver module 200, via the shared serial bus 222. Such digital signals and/or data include: temperature and/or wavelength commands and status, temperature control status, temperature control current, and the like, or any subset of these signals and data.

In embodiments where the ROSA 210 includes an avalanche photodiode, the transceiver module 200 preferably also includes an avalanche photodiode (APD) bias control IC 254 coupled to the ROSA 210 and to the shared serial bus 222. The APD bias control IC 254 transmits a bias signal to the ROSA 210 for controlling the operation of the avalanche photodiode in the ROSA 210.

The APD bias control IC 254 is also electrically coupled to the shared serial bus 222 via a serial connection. A number of digital signals and/or data may be communicated between the APD bias control IC 254 and the main controller 226, or other devices within the transceiver module 200, via the shared serial bus 222. Such digital signals and/or data include: bias voltage (command and status), bias current, temperature compensation control and/or monitoring signals, or any subset of these signals.

Figure 2B:
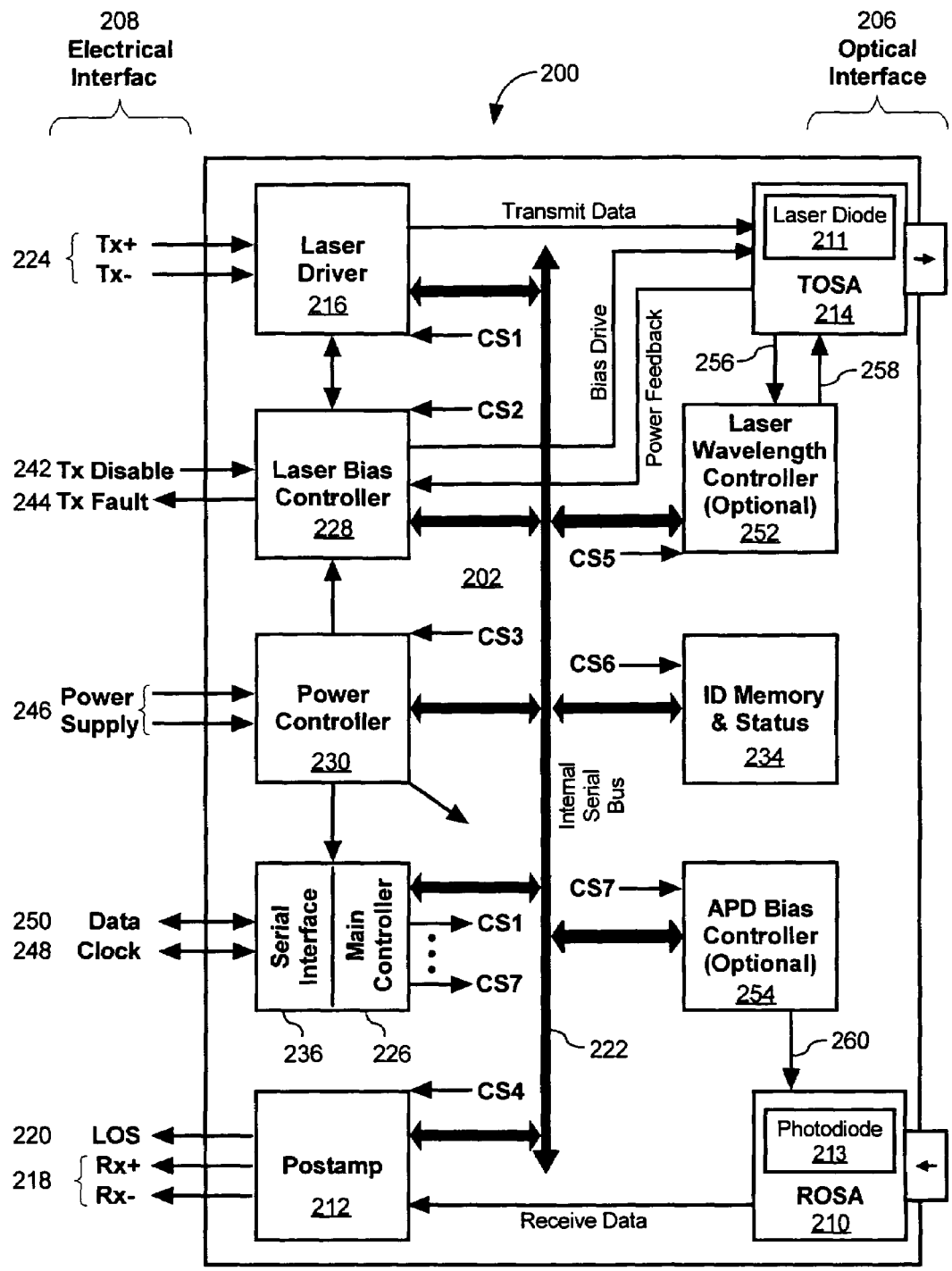
FIG. 2B is a schematic representation of the circuitry and components of an optical transceiver module that uses a chip select serial protocol, according to another embodiment of the invention.

FIG. 2B is a schematic representation of the circuitry and components of an optical transceiver module that uses a chip select serial protocol. This embodiment is identical in all respects to the embodiment described in relation to FIG. 2A, except that the individual addressable components are addressed by dedicated hardware in the form of chip selects, shown as CS1-CS7. Dedicated chip select lines or wires CS1-CS7 couple the main controller 226 (master) to each addressable component (slave). Each chip select is a signal that when true permits input and output of the addressable component's memory, and when false prohibits such input and output. (See the discussion below of component memory 404.) Therefore, in use, each time input or output from an addressable component is required, the main controller 226 (FIG. 2) sends a chip select signal only to that particular addressable component, thereby allowing input or output to that addressable component. It should be appreciated that although only seven chip select lines are shown, either more or less chip select lines may be used.

This embodiment is simpler to manufacture and is less expensive than the embodiment described in FIG. 2A. However, a dedicated chip select line running to each addressable component takes up valuable board area. A suitable chip select serial protocol is Serial Peripheral Interface (SPI) that utilizes a data-in pin, a data-out pin, a clock pin, and a chip select pin on each component.

Figure 2C:
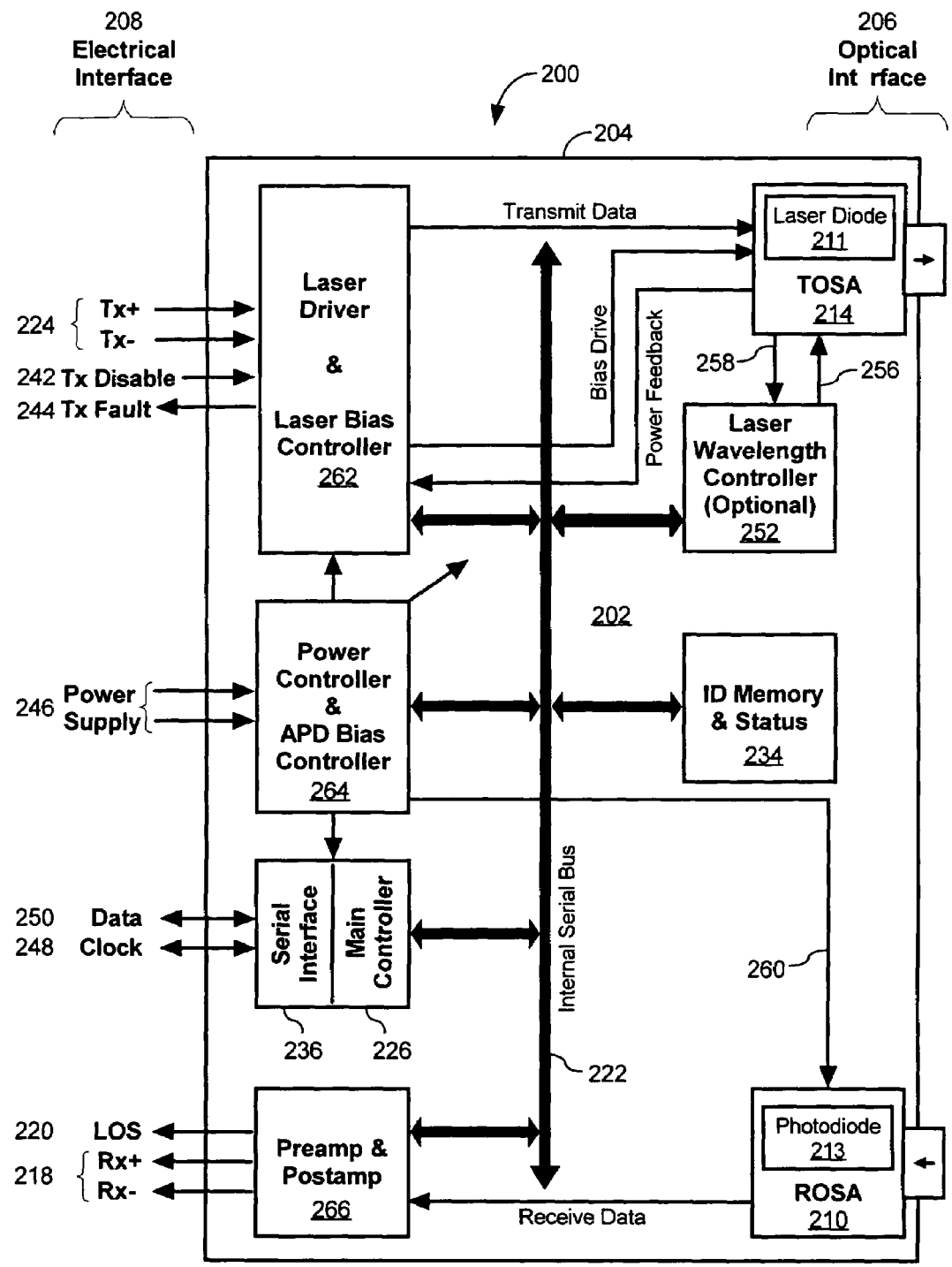
FIG. 2C is a schematic representation of the circuitry and components of an optical transceiver module, according to another embodiment of the invention.

FIG. 2C is a schematic representation of the circuitry and components of an optical transceiver module, according to another embodiment of the invention. This embodiment illustrates that the components within the optical transceiver module may be combined. For example, the optical transceiver module may include a single: laser driver and laser bias controller 262; power controller and APD Bias Controller 264; and pre-amplifier and post-amplifier 266. It should, however, be appreciated that these combined components are merely exemplary and any other combination of components may be used.

Figure 3:
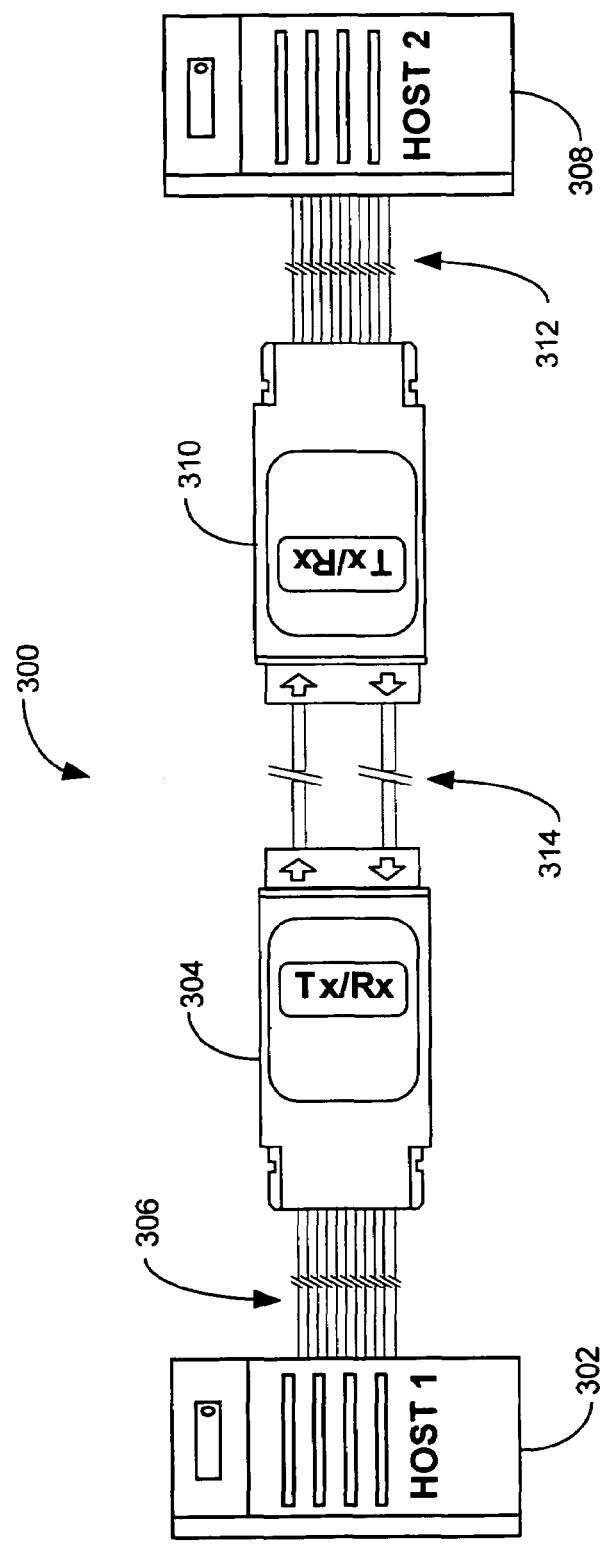
FIG. 3 is a schematic representation of a system utilizing fiber optic transceiver modules similar to that shown in FIGS. 2A and 2B.

FIG. 3 is a schematic representation of a system 300 utilizing fiber optic transceiver modules (also known as optoelectronic transceivers) similar to that shown in FIG. 2. First host 302 is electrically coupled to a first optical transceiver module 304 via electrical links 306. These electrical links 306 preferably connect to the input/output pins of the first optical transceiver module 304. These input/output pins preferably include the connections or pins shown in FIG. 2 as Tx+ and Tx− 224, Tx disable 242, Tx fault 244, the power supply 246, data 250, clock 248, LOS 220, and Rx+ and RX− 218 pins. Likewise, a second host 308 is electrically coupled to a second optical transceiver module 310 via electrical links 312. Also, the first and second optical transceivers 304 and 310 are optically coupled to one another via optical fibers 314, i.e., TOSA to ROSA.

Figure 4A:
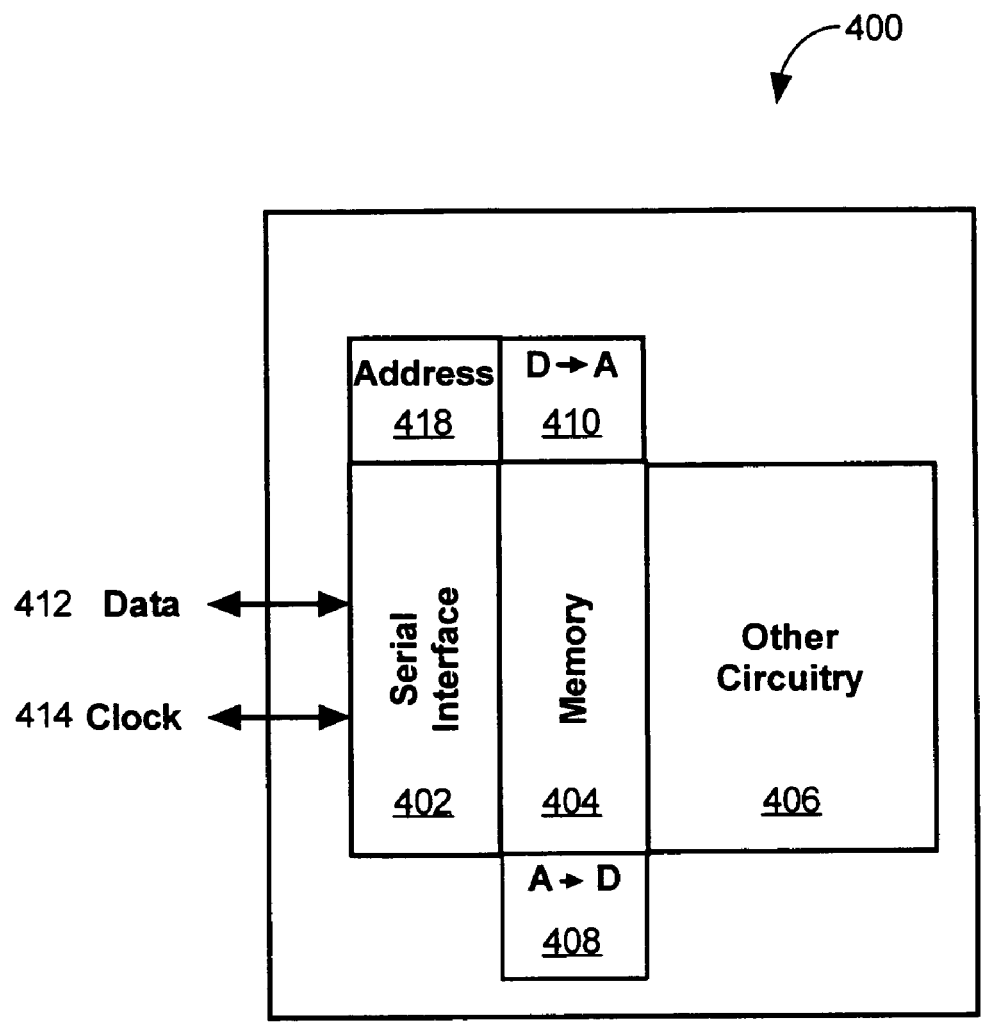
FIG. 4A is a schematic representation of an exemplary addressable component of the optical transceiver module shown in FIG. 2A.

FIG. 4A is a schematic representation of an exemplary addressable component 400 of the optical transceiver module 200 shown in FIG. 2A. As described above, the addressable component 400 is preferably a single integrated circuit (IC). The exemplary addressable component 400 may be any addressable component in the transceiver module 200 that is coupled to the shared serial bus 222 (FIG. 2A or 2B), such as the laser driver IC 216 (FIG. 2A), post-amplifier IC 212 (FIG. 2A), or the like. The addressable component 400 includes a serial interface 402 coupled to the internal serial bus 222 (FIG. 2) via data 412 and clock 414 lines. The serial interface 402 preferably communicates with other devices coupled to the serial bus 222 (FIG. 2) using any suitable signaling protocol, such as a component address serial protocol like I2C or MDIO, as described above in relation to FIG. 2A, or a chip select serial protocol, like SPI, as described above in relation to FIG. 2B.

Each addressable component 400 also preferably includes a memory 404 for storing data, such as monitored variables, commands and/or control parameters received from other components or from a host device, or the like. The memory 404 may include a memory array or one or more registers, or both a memory array and registers, and may include volatile and/or non-volatile memory components or registers. The memory may also include a FIFO, cache, or the like. In some addressable components 400, the memory 404 may have very few memory elements (e.g., command and/or feedback registers) or locations that are used by the component, while other components may have a larger number of memory elements or locations.

The addressable component 400 also preferably includes a digital to analog converter (DAC) 410 for converting digital data received at the serial interface 402 into analog signals that can be used by the addressable component 400. If none of the data or control parameters received by a particular addressable component 400 require conversion into an analog signal, a DAC 410 need not be included in the addressable component. For instance, on/off control parameters received by an addressable component can usually be converted into control signals without the use of a DAC 410. Thus, some of the addressable components 400 in a transceiver module may include a DAC 410 while one or more of the other components do not include a DAC 410.

In addition, the addressable component 400 preferably includes an analog to digital converter (ADC) 408 for converting analog signals to digital signals that can be transmitted to the internal serial bus 222 (FIG. 2) via the data line 412. The analog signals coupled to the ADC 408 are typically voltage or current signals whose magnitude or value is being monitored. If there are no analog signals in the addressable component whose magnitude or value is being monitored, an ADC 408 need not be included in the addressable component. Thus, some of the addressable components 400 in a transceiver module may include an ADC 408 while one or more of the other components do not include an ADC 408.

Other circuitry 406 in the addressable component 400 performs the setup, control, monitoring, and/or safety functions of the addressable component, as described above in relation to FIG. 2.

If the addressable component 400 utilizes a component address serial protocol like I2C or MDIO, as described in relation to FIG. 2A, the addressable component 400 preferably includes a unique address 418, which enables data/signals to be sent to and from a specific addressable component 400 via the shared, internal serial bus 222 (FIG. 2) and data line 412.

Figure 4B:
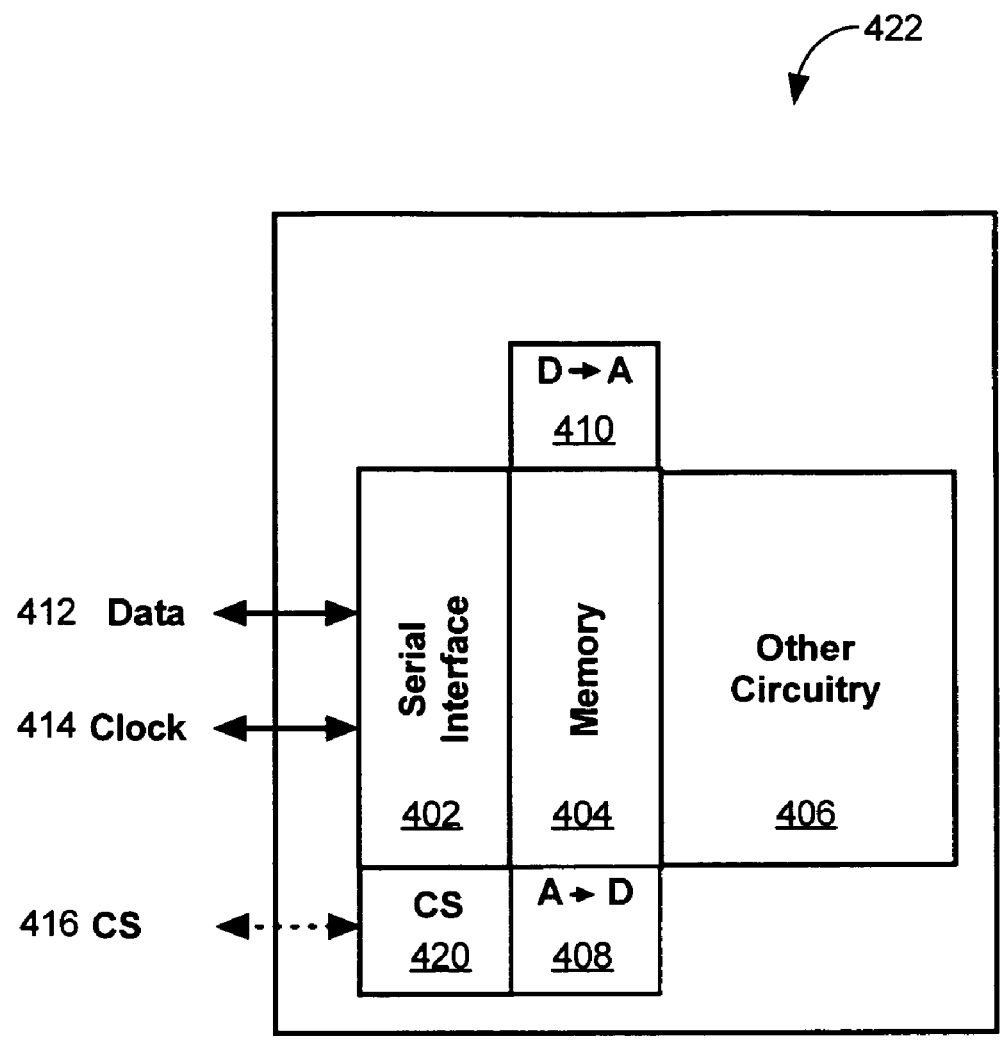

FIG. 4B is a schematic representation of an exemplary addressable component 422 of the optical transceiver module 200 shown in FIG. 2B. This embodiment is identical in all respects to the embodiment described in relation to FIG. 4A, except that the addressable component 422 dos not include an address 418 and rather includes chip select logic 420 coupled to a chip select line 416. This embodiment utilizes a chip select serial protocol, such as SPI, as described in relation to FIG. 2B. In use, each time input or output from an addressable component is required, the main controller 226 (FIG. 2) sends a chip select signal only to that particular addressable component, thereby allowing input or output to that addressable component.

Consequently, the above described transceiver module 200 (FIG. 2) includes a shared internal serial bus 222 (FIG. 2) that connects to a plurality of addressable components 400 (FIG. 4A) or 422 (FIG. 4B) in the transceiver module 200 (FIG. 2). This allows a plurality of functions to be performed via a single digital electrical connection that is coupled to each addressable component. Also, overall system complexity is reduced by eliminating or reducing the need for multiple analog or digital lines to each component. This conserves valuable board area for other components or circuitry and may even allow for a smaller transceiver package or housing 204 (FIG. 2A). In addition, the shared internal serial bus allows for scalability, i.e., allowing additional functionality to be added to a transceiver with very little circuitry redesign.

One use of such a single, shared internal serial bus is to address problems associated with jitter, such as deterministic jitter and in particular pattern dependent jitter. Typically, jitter refers to bit transitions offset in time from the norm, i.e. occurring either before or after a uniformed clocked period. In other words, Jitter is a bit arriving either ahead or behind a standard clock cycle.

To address problems associated with jitter, the main controller 226 (FIGS. 2A-2C) recognizes preceding bits or patterns and adjusts a delay to ensure that the bit transitions are not offset in time and occur at a uniformed standard clock cycle.

Any attempt to address jitter in prior art devices would necessitate a separate control line for each delay or source of jitter that is to be adjusted. This solution may not be practical if a large number of separate control lines are required to address a corresponding number of delays or sources of jitter. However, by using a single, shared internal serial bus, the present invention allows for the monitoring and correction of jitter, as only one line or communication bus is needed.

Another advantage is in an embodiment that incorporates the laser driver IC 216 (FIG. 2A) into the TOSA 214 (FIG. 2A). This embodiment would be impractical in the prior art, as too many control and monitoring lines would be needed by the combined component. Again, however, the present invention allows for such a combined component, as only a single, shared serial bus need be connected to the combined component for conveying control signals to the components and for receiving status monitoring information from the component.

It should be appreciated by those skilled in the art that each of addressable components described herein may comprise a single IC, multiple IC's, analog circuitry, a combination of IC's and analog circuitry, or the like. Also, it should be appreciated to those skilled in the art that despite the fact that the preferred embodiment described above utilizes a single, shared serial bus, more than one internal serial bus may be provided in other embodiments of the present invention.

Figure 5:
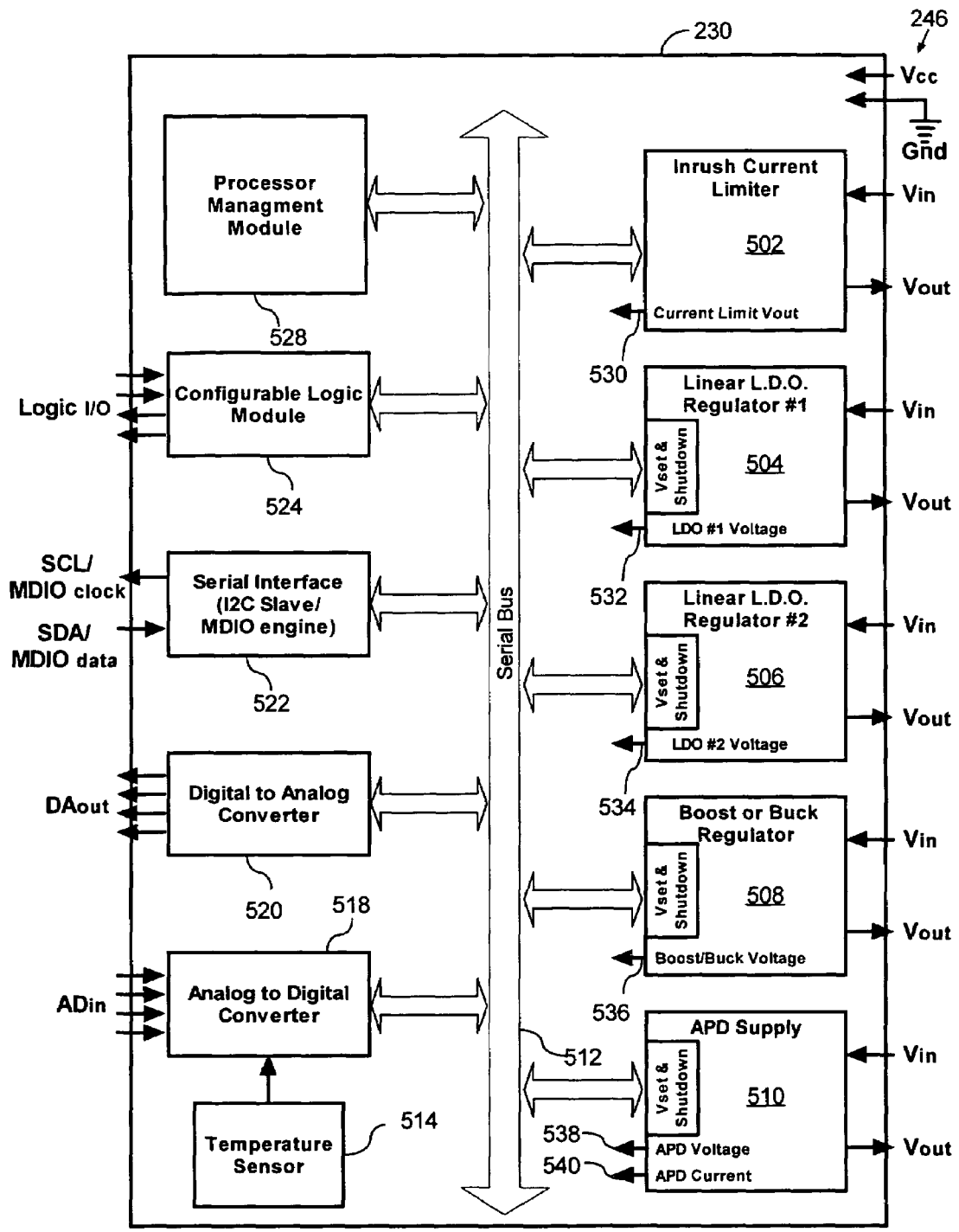
FIG. 5 is a schematic representation of the power controller integrated circuit (IC) shown in FIGS. 2A and 2B.

FIG. 5 is a schematic representation of the power controller integrated circuit (IC) 230 shown in FIGS. 2A and 2B. In a preferred embodiment, the power controller IC 230 is a single integrated circuit that both supplies and regulates power to the remainder of the transceiver module 200 (FIG. 2). Alternatively, the power controller IC 230 may be split between two or more integrated circuits.

The power controller IC 230 preferably includes multiple components integrated within the power controller IC 230, such as voltage regulators, converters, and the like. The power controller IC 230 is preferably coupled to an external power supply at power supply input (Vcc and Ground) 246. The power controller IC 230 also preferably includes its own internal serial bus 512, such as a Serial Peripheral Interface (SPI) bus, which is used to communicate synchronously over short distances at up to 4 Mbit/s. This serial bus 512 is internal to the power controller IC 230, and facilitates communication between the various components within the power controller IC 230, where each of the various components within the power controller IC 230 has a unique component address.

The power controller IC 230 preferably includes two or more voltage regulators 504-510 that provide regulated voltage to the various components within the optical transceiver module. Each voltage regulator provides either a fixed or adjustable voltage that can be supplied to one or more of the components within the optical transceiver module. The voltage regulators 504-510 preferably include multiple low drop-out (LDO) voltage regulators 504 and 506. These LDO regulators 504 and 506 typically provide a regulated output voltage ($V_{out}$) that is only a small drop in voltage from an unregulated input voltage ($V_{in}$). For example, an input voltage ($V_{in}$) of 1.7v to 6.0v is regulated to a 1.5v to 5.5v output voltage ($V_{out}$), typically at a preferred current of 150 ma The voltage regulators 504-510 also preferably include at least one boost or buck regulator 508. This boost or buck regulator 508 either steps-ups or steps-down the input voltage (Vin) to an output voltage ($V_{out}$). For example, an input voltage of 1.7v to 6.0v can be stepped-up or stepped-down to a 1.8v to 12.0v output voltage ($V_{out}$). Yet another one or more voltage regulators 504-510 is preferably an Avalanche Photo Diode (APD) voltage supply 510. As an APD requires a large voltage to operate, the APD voltage supply 510 preferably supplies a 40v to 75v output voltage ($V_{out}$) (from a 1.7v to 6.0v input voltage, $V_{in}$), typically at a preferred current of 2 ma.

The power controller IC 230 also preferably includes a serial interface 522 for coupling to and communicating with the optical transceiver module's internal serial bus 222 (FIGS. 2A-2B). In a preferred embodiment, the serial interface 522 operates in accordance with a two wire serial interface standard that is used in the GBIC and SFP (Small Form Factor Pluggable) standards for optical transceivers. For example, the serial interface 522 may operate in accordance with the I2C (or $I^2C$) or MDIO serial communication standard. Accordingly, communication can occur between any internal component within the power controller IC 230 and any other component that is coupled to the internal serial bus 222 (FIGS. 2A and 2B). Accordingly, a number of digital signals and/or data may be communicated between the power controller IC 230 and the main controller 226 (FIGS. 2A and 2B)—via the serial bus 512, the serial interface 522 and the internal serial bus 222 (FIGS. 2A and 2B). Furthermore, digital signals and/or data may be communicated between the power controller IC 230 and an external host—via the serial bus 512, the serial interface 522, the internal serial bus 222 (FIGS. 2A and 2B), and the serial interface 236 (FIGS. 2A and 2B). Such digital signals and/or data may include: voltage commands, voltage and current status, temperature, power down or sleep mode commands or status information, control signals, step-up signals, step-down signals, surge control functions, or the like.

The voltage regulators 504-510 are also preferably adjustable, i.e., the voltage regulators 504-510 are voltage programmable voltage regulators. In a preferred embodiment, the voltage regulators 504-510 are separately addressable and coupled to the serial bus 512. This allows the main controller 226 (FIGS. 2A and 2B), that is coupled to the transceiver module's internal serial bus 222 (FIGS. 2A-2B), to program the voltage regulators 504-510 by specifying a desired voltage (Vset) (i.e., by sending a voltage level setting command) during power-up. Also, the main controller 226 (FIGS. 2A and 2B) may shutdown the voltage regulators 504-510, if necessary, such as if a fault condition is detected. Furthermore, level setting commands are either sent continuously to each component at a predetermined rate, or only once during power up.

In addition, the power controller IC 230 also preferably includes a processor management module 528. The processor management module 528 is otherwise known as a power supply supervisory chip or watchdog. The processor management module 528 is preferably configured to monitor the regulated supply voltage and microprocessor activity, provide reset signals, retain the contents of any volatile memory by providing a low-current DC voltage to volatile memory when regular power is off, and determine when ordinary power has resumed.

The power controller IC 230 also preferably includes an inrush current limiter 502 coupled to the serial bus 512. High inrush current can be produced when the optical transceiver module is turned on. This high inrush current can cause problems in host equipment and exceed module specification limits. Accordingly, the inrush current limiter or surge limiter 502 reduces or limits inrush current by presenting a relatively high resistance at turn on, and gradually reduces it's resistance to a small value to allow full supply voltage into the module.

The power controller IC 230 may also include other internal components, such as one or more analog to digital converters 518 (e.g., for monitoring one or more voltages or other signals within the optical transceiver modue), one or more digital to analog converters 520 (each of which generates an output voltage or current in accordance with the digital value presented to the converter 520), a configurable logic module 524, one or more multiplexers, or the like. As the power controller IC 230 may generate considerable heat, a temperature sensor 514 may also be coupled to the analog to digital converter 518 to monitor the power controller IC's temperature In addition, the current limit Vout 530; LDO #1 voltage 532, LDO #2 voltage; boost/buck voltage 536; APD voltage 538; and APD current 540 are status and/or diagnostic monitor signals. These signals are preferably an analog voltage proportional to the respective outputs, which are digitized by the analog to digital converter 518. Alternatively, these signals are digital derived from a local analog to digital converter (or other means) within each component. These signals are used to monitor the performance and setting of the regulator, and may be used for feedback in closed loop control systems. Also, currents used or supplied by the various components can be from a few milliamps delivered by the APD supply, up to an amp for the inrush limiter, or nominal 50 ma to 150 ma for the other regulators.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, other embodiments may include fewer or more components, different combinations of components, different serial protocols, or the like. In another example, two or more of the components shown in FIG. 5 may be combined into a single integrated circuit having a single interface to the serial bus 512. Such combinations may be advantageous for reasons of cost, shared functionality, packaging requirements, power utilization, or the like. The embodiments were chosen and described above in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents. In addition, any references cited above are incorporated herein by reference.

TABLE 1

MEMORY MAP FOR TRANSCEIVER CONTROLLER

| Memory Location (Array 0) | Name of Location | Function |
| --- | --- | --- |
| 00h-5Fh | IEEE Data | This memory block is used to store required GBIC data |
| 60h | Temperature MSB | This byte contains the MSB of the 15-bit 2's complement temperature output from the temperature sensor. |
| 61h | Temperature LSB | This byte contains the LSB of the 15-bit 2's complement temperature output from the temperature sensor. (LSB is 0b). |
| 62h-63h | $V_{cc}$ Value | These bytes contain the MSB (62h) and the LSB (63h) of the measured $V_{cc}$ (15-bit number, with a 0b LSbit) |
| 64h-65h | $B_{in}$ Value | These bytes contain the MSB (64h) and the LSB (65h) of the measured $B_{in}$ (15-bit number, with a 0b LSbit) |
| 66h-67h | $P_{in}$ Value | These bytes contain the MSB (66h) and the LSB (67h) of the measured $P_{in}$ (15-bit number, with a 0b LSbit) |
| 68h-69h | $R_{in}$ Value | These bytes contain the MSB (68h) and the LSB (69h) of the measured $R_{in}$ (15-bit number, with a 0b LSbit) |
| 6Ah-6Dh | Reserved | Reserved |
| 6Eh | IO States | This byte shows the logical value of the I/O pins. |

TABLE 1-continued

| | | |
|---|---|---|
| 6Fh | A/D Updated | Allows the user to verify if an update from the A/D has occurred to the 5 values: temperature, $V_{cc}$, $B_{in}$, $P_{in}$ and $R_{in}$. The user writes the byte to 00h. Once a conversion is complete for a give value, its bit will change to '1'. |
| 70h-73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h-77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h-7Ah | Reserved | Reserved |
| 7Bh-7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4 or 5 |
| 80h-F7h | | Customer EEPROM |
| 87h | DA % Adj | Scale output of D/A converters by specified percentage |

| Memory Location (Array 1) | Name of Location | Function of Location |
|---|---|---|
| 00h-FFh | | Data EEPROM |

| Memory Location (Array 2) | Name of Location | Function of Location |
|---|---|---|
| 00h-Ffh | | Data EEPROM |

| Memory Location (Array 3) | Name of Location | Function of Location |
|---|---|---|
| 80h-81h 88h-89h 90h-91h 98h-99h A0h-A1h | Temperature High Alarm $V_{cc}$ High Alarm $B_{in}$ High Alarm $P_{in}$ High Alarm $R_{in}$ High Alarm | The value written to this location serves as the high alarm limit. Data format is the same as the corresponding value (temperature, $V_{cc}$, $B_{in}$, $P_{in}$, $R_{in}$). |
| 82h-83h 8Ah-8Bh 92h-93h 9Ah-9Bh A2h-A3h | Temperature Low Alarm $V_{cc}$ Low Alarm $B_{in}$ Low Alarm $P_{in}$ Low Alarm $R_{in}$ Low Alarm | The value written to this location serves as the low alarm limit. Data format is the same as the corresponding value (temperature, $V_{cc}$, $B_{in}$, $P_{in}$, $R_{in}$). |
| 84h-85h 8Ch-8Dh 94h-95h 9Ch-9Dh A4h-A5h | Temp High Warning $V_{cc}$ High Warning $B_{in}$ High Warning $P_{in}$ High Warning $R_{in}$ High Warning | The value written to this location serves as the high warning limit. Data format is the same as the corresponding value (temperature, $V_{cc}$, $B_{in}$, $P_{in}$, $R_{in}$). |
| 86h-87h 8Eh-8Fh 96h-97h 9Eh-9Fh A6h-A7h | Temperature Low Warning $V_{cc}$ Low Warning $B_{in}$ Low Warning $P_{in}$ Low Warning $R_{in}$ Low Warning | The value written to this location serves as the low warning limit. Data format is the same as the corresponding value (temperature, $V_{cc}$, $B_{in}$, $P_{in}$, $R_{in}$). |
| A8h-AFh, C5h B0h-B7h, | $D_{out}$ control 0-8 $F_{out}$ control 0-8 $L_{out}$ control 0-8 | Individual bit locations are defined in Table 4. |

TABLE 1-continued

| | | |
|---|---|---|
| C6h B8h-BFh, C7h | Reserved | Reserved |
| C0h | Prescale | Selects MCLK divisor for X-delay CLKS. |
| C1h | $D_{out}$ Delay | Selects number of prescale clocks |
| C2h | $D_{out}$ Delay | |
| C3h | $F_{out}$ Delay | |
| C4h | $L_{out}$ Delay | |
| C8h-C9h | $V_{cc}$ - A/D Scale | 16 bits of gain adjustment for corresponding A/D conversion values. |
| CAh-CBh | $B_{in}$ - A/D Scale | |
| CCh-CDh | $P_{in}$ - A/D Scale | |
| CEh-CFh | $R_{in}$ - A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h-D6h | PW1 Byte 3 (D3h) MSB PW1 Byte 2 (D4h) PW1 Byte 1 (D5h) PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h-DFh | $B_{in}$ Fast Trip | These bytes define the fast trip comparison over temperature. |
| E0h-E3h | $P_{in}$ Fast Trip | These bytes define the fast trip comparison over temperature. |
| E4h-E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh-EBh | Internal State Bytes | Location of the bits is defined in Table 4 |
| ECh | I/O States 1 | Location of the bits is defined in Table 4 |
| EDh-EEh | D/A Out | Magnitude of the temperature compensated D/A outputs |
| EFh | Temperature Index | Address pointer to the look-up Arrays |
| F0h-FFh | Reserved | Reserved |

| Memory Location (Array 4) | Name of Location | Function of Location |
|---|---|---|
| 00h-Ffh | | D/A Current vs. Temp #1 (User-Defined Look-up Array #1) |

| Memory Location (Array 5) | Name of Location | Function of Location |
|---|---|---|
| 00h-Ffh | | D/A Current vs. Temp #2 (User-Defined Look-up Array #2) |

TABLE 2

DETAIL MEMORY DESCRIPTIONS - A/D VALUES AND STATUS BITS

| Byte | Bit | Name | Description |
|---|---|---|---|
| Converted analog values. Calibrated 16 bit data. (See Notes 1-2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | $V_{cc}$ MSB | Internally measured supply voltage in transceiver. Actual voltage is full 16 bit value * 100 uVolt. (Yields range of 0-6.55 V) |
| 99 | All | $V_{cc}$ LSB | |
| 100 | All | TX Bias MSB | Measured TX Bias Current in mA Bias current is full 16 bit value *(1/256) mA. (Full range of 0-256 mA possible with 4 uA resolution) |
| 101 | All | TX Bias LSB | |
| 102 | All | TX Power MSB | Measured TX output power in mW. Output is full 16 bit value *(1/2048) mW. (see note 5) |
| 103 | All | TX Power LSB | (Full range of 0-32 mW possible with 0.5 μW resolution, or −33 to +15 dBm) |
| 104 | All | RX Power MSB | Measured RX input power in mW RX power is full 16 bit value *(1/16384) mW. (see note 6) |

TABLE 2-continued

DETAIL MEMORY DESCRIPTIONS - A/D VALUES AND STATUS BITS

| Byte | Bit | Name | Description |
|---|---|---|---|
| 105 | All | RX Power LSB | (Full range of 0-4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |
| 108 | All | Reserved MSB | Reserved for 2nd future definition of digitized analog input |
| 109 | All | Reserved LSB | Reserved for 2nd future definition of digitized analog input |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | $V_{cc}$ A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS - ALARM AND WARNING FLAG BITS
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | $V_{cc}$ High Alarm | Set when internal supply voltage exceeds high alarm level. |
| 112 | 4 | $V_{cc}$ Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5-0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | $V_{cc}$ High Warning | Set when internal supply voltage exceeds high warning level. |
| 116 | 4 | $V_{cc}$ Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | R ft hi set | P ft hi set | D-in inv set | D-in set | F-in inv set |

TABLE 4-continued

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data select | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |
| D/A cntl | source/sink 1/0 | $2^2$ | D/A #2 range $2^1$ | $2^0$ | source/sink 1/0 | $2^2$ | D/A #1 range $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale 2 | Pos_Scale 1 | Pos_Scale 0 |
| Margin #2 | Reserved | Neg_Scale2 | Neg_Scale1 | Neg_Scale0 | Reserved | Pos_Scale 2 | Pos_Scale 1 | Pos_Scale 0 |

What is claimed is:

1. An optical transceiver module, comprising:
a transceiver housing;
a plurality of components disposed at least partially within said transceiver housing, said components including:
an optical transmitter; and
an optical receiver;
a power controller integrated circuit (IC) electrically coupled to at least one of said plurality of components, where said power controller IC is configured to perform power supply functions for said optical transceiver module and said power controller IC includes multiple voltage regulators configured and arranged to provide power to said components at two or more voltages;
a main controller integrated circuit (IC) positioned within the transceiver housing and electrically coupled to said optical transmitter, said optical receiver and said power controller IC;
a host serial interface coupled directly to the main controller IC, the host serial interface including both clock line and data line interfaces configured to enable communication between the host serial interface and an external host; and
an internal serial bus to which the main controller IC and the power controller IC are connected in parallel.

2. The optical transceiver module of claim 1, wherein at least one of said multiple voltage regulators is a low dropout voltage regulator configured to receive an unregulated input voltage and configured to supply a regulated output voltage to at least one of said elements.

3. The optical transceiver module of claim 1, wherein at least one of said multiple voltage regulators is a boost or buck regulator electrically coupled to at least one of said components.

4. The optical transceiver module of claim 1, wherein said power controller IC further includes a serial bus within said power controller IC.

5. The optical transceiver module of claim 4, wherein said multiple voltage regulators are electrically coupled to said serial bus.

6. The optical transceiver module of claim 5, wherein said power controller IC further comprises a serial interface electrically coupled to said serial bus.

7. The optical transceiver module of claim 5, wherein said voltage regulators are individually addressable.

8. The optical transceiver module as recited in claim 4, wherein the power controller IC further comprises the following components, each of which is electrically connected to the serial bus within the power controller IC:
a configurable logic module;
a processor management module;
a serial interface;
an analog-to-digital converter;
a digital-to-analog converter; and
an inrush current limiter.

9. The optical transceiver module of claim 1, wherein at least one of said voltage regulators includes an Avalanche Photo Diode (APD) voltage supply.

10. The optical transceiver module of claim 1, wherein at least one of said voltage regulators is adjustable.

11. The optical transceiver module of claim 1, wherein said power controller IC further includes a plurality of components selected from a group consisting of: an analog to digital converter, a temperature sensor, a digital to analog converter, a logic module, an inrush current limiter, and a processor management module.

12. The optical transceiver module of claim 1, wherein said components further include a laser driver IC electrically coupled to said optical transmitter, and a post-amplifier IC electrically coupled to said optical receiver.

13. The optical transceiver module of claim 1, wherein said power controller IC is responsive to signals from said main controller.

14. The optical transceiver module of claim 1, further comprising an internal serial bus to which the power controller IC and main controller IC are connected in parallel, and the internal serial bus being connected to the optical transmitter and to the optical receiver.

15. An optical transceiver module, comprising:
- a transceiver housing;
- an optical transmitter and an optical receiver disposed within the transceiver housing;
- a plurality of addressable components;
- a power controller integrated circuit (IC) including a plurality of adjustable power supplies, the optical transmitter, the optical receiver, and one of the plurality of addressable components each being electrically coupled to an adjustable power supply;
- a main controller integrated circuit (IC) electrically coupled to the optical transmitter, the optical receiver and the power controller IC; and
- an internal serial bus to which the power controller IC and the main controller IC are connected in parallel, the internal serial bus being connected to the optical transmitter, the optical receiver, and an addressable component, and the main controller IC serves as a serial bus master for the internal serial bus.

16. The optical transceiver module as recited in claim 15, wherein each of the addressable components comprises: a serial interface configured for communication with the internal serial bus; and, a memory.

17. The optical transceiver module as recited in claim 15, wherein the power controller IC comprises an addressable power controller IC.

18. The optical transceiver module as recited in claim 15, wherein the plurality of addressable components comprises one or more of the following: a laser driver; a laser
- bias controller; a pre-amplifier; a post-amplifier; a laser wavelength controller; a thermoelectric
- controller; an analog-to-digital converter; a digital-to-analog converter; and, an APD bias controller.

19. The optical transceiver module as recited in claim 15, wherein the power controller IC further comprises a serial bus to which the adjustable power supplies are coupled, and the power controller IC further comprising:
- a configurable logic module connected to the serial bus; and
- a processor management module connected to the serial bus.

20. The optical transceiver module as recited in claim 15, further comprising a plurality of dedicated chip select lines, each of the dedicated chip select lines connecting a corresponding addressable component to the main controller IC.

* * * * *

UNITED STATES PATENT AND TRADEMARK OFFICE
CERTIFICATE OF CORRECTION

PATENT NO. : 7,359,643 B2 Page 1 of 2
APPLICATION NO. : 10/614112
DATED : April 15, 2008
INVENTOR(S) : Aronson et al.

It is certified that error appears in the above-identified patent and that said Letters Patent is hereby corrected as shown below:

Drawings
Sheet 3, replace Figure 2B with the figure depicted below, wherein preamp 215 has been added, laser temperature drive has been relabeled 256 and laser temperature or wavelength feedback has been relabeled 258

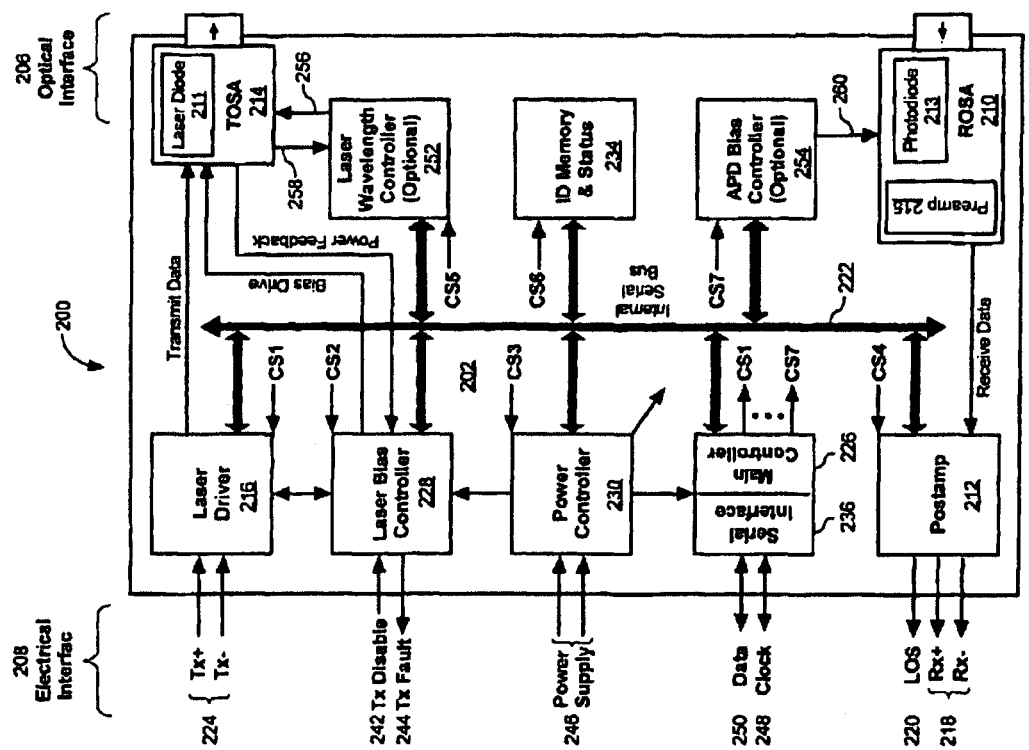

Signed and Sealed this

Seventeenth Day of August, 2010

David J. Kappos
*Director of the United States Patent and Trademark Office*

Column 5
Line 41, before "FIG. 5" add the following drawing description: [FIG. 4B is a schematic representation of an exemplary addressable component of the optical transceiver module shown in FIG. 2B;]

Column 6
Line 24, after "ROSA" add [210]

Column 8
Line 53, after "bias signal" add [260]

Column 9
Line 25, after "module" add [200]
Line 28, after "module" add [200]
Line 29, after "module" add [200]
Line 56, after "200" add [(FIG. 2)]
Line 57, change "FIG. 2A or 2B" to --FIGS. 2A-2C--

Column 11
Line 17, change "In other words, Jitter" to --In other words, jitter--

Column 13
Line 38, change "temperature In" to --temperature. In--

Column 14
Line 1, after "LDO #2 voltage" add [534]